(12) United States Patent
Sheng et al.

(10) Patent No.: US 9,832,637 B2
(45) Date of Patent: Nov. 28, 2017

(54) CONNECTION INFORMATION SHARING SYSTEM, COMPUTER PROGRAM, AND CONNECTION INFORMATION SHARING METHOD THEREOF

(71) Applicant: Gunitech Corp., Hsinchu County (TW)

(72) Inventors: Shih-Chao Sheng, Hsinchu County (TW); Ming-Yi Wang, Hsinchu County (TW)

(73) Assignee: Gunitech Corp., Hsinchu County (TW)

( * ) Notice: Subject to any disclaimer, the term of this patent is extended or adjusted under 35 U.S.C. 154(b) by 93 days.

(21) Appl. No.: 14/833,205

(22) Filed: Aug. 24, 2015

(65) Prior Publication Data

US 2016/0302056 A1    Oct. 13, 2016

(30) Foreign Application Priority Data

Apr. 13, 2015 (TW) .............................. 104111822 A

(51) Int. Cl.
| | | |
|---|---|---|
| *H04W 8/22* | (2009.01) | |
| *H04W 4/06* | (2009.01) | |
| *H04W 8/00* | (2009.01) | |
| *G06F 9/54* | (2006.01) | |
| *H04W 40/24* | (2009.01) | |
| *H04W 84/18* | (2009.01) | |

(52) U.S. Cl.
CPC ............... *H04W 8/22* (2013.01); *G06F 9/54* (2013.01); *H04W 4/06* (2013.01); *H04W 8/005* (2013.01); *H04W 40/24* (2013.01); *H04W 84/18* (2013.01)

(58) Field of Classification Search
CPC .............. H04L 12/2803; H04L 12/281; H04L 12/2814; H04L 12/283; H04L 12/2856; H04L 25/497; H04W 4/06; H04W 8/22
See application file for complete search history.

(56) References Cited

U.S. PATENT DOCUMENTS

| | | | | |
|---|---|---|---|---|
| 2009/0323959 A1* | 12/2009 | Hara | ........................ | G09C 5/00 380/277 |
| 2013/0094538 A1* | 4/2013 | Wang | ..................... | H04B 1/707 375/141 |
| 2014/0006569 A1* | 1/2014 | Ferrazzini | ........... | H04L 12/2809 709/220 |
| 2014/0236728 A1* | 8/2014 | Wright | ............... | G06Q 30/0272 705/14.58 |
| 2014/0362836 A1 | 12/2014 | Locker et al. | | |

(Continued)

FOREIGN PATENT DOCUMENTS

| | | |
|---|---|---|
| TW | M483615 U | 8/2014 |
| TW | 201438481 A | 10/2014 |

*Primary Examiner* — Benjamin H Elliott, IV

(74) *Attorney, Agent, or Firm* — Alan D. Kamrath; Kamrath IP Lawfirm, P.A.

(57) ABSTRACT

A connection information sharing system is applied in a mesh network environment which has at least one controlled device within. A connection information sharing method thereof includes the steps of: performing a transferring process, including: integrating a connection data to an integration data; converting the integration data to generate a connection code; performing a receiving process, including: reading the connection code; restoring the connection code to the integration data; and establishing a connection with the at least one controlled device via the integration data.

7 Claims, 3 Drawing Sheets

(56) References Cited

U.S. PATENT DOCUMENTS

| | | | |
|---|---|---|---|
| 2015/0245204 A1* | 8/2015 | Heydon | H04L 43/0817 713/171 |
| 2015/0346701 A1* | 12/2015 | Gordon | G05B 15/02 700/275 |
| 2016/0072638 A1* | 3/2016 | Amer | H04L 67/1002 398/106 |
| 2016/0277202 A1* | 9/2016 | Davis | H04L 12/282 |
| 2016/0302056 A1* | 10/2016 | Sheng | H04W 4/06 |

* cited by examiner

CONNECTION INFORMATION SHARING SYSTEM, COMPUTER PROGRAM, AND CONNECTION INFORMATION SHARING METHOD THEREOF

BACKGROUND OF THE INVENTION

1. Field of the Invention

The present invention relates to a connection information sharing system and a connection information sharing method thereof. More particularly, the present invention relates to a connection information sharing system for directly transferring the connection data and a connection information sharing method thereof.

2. Description of the Related Art

As technology develops, many kinds of wireless network applications are also developed, and some wireless network applications are also applied to the connection method for the home automation device. A mesh network environment is already disclosed in the prior art. The mesh network environment has some advantage, such as it has no distance limitation and it does not need the hub, to achieve the object of home automation controlling, such as using the CSRmesh™ technology of CSR company. Via this technology, the user can use the portable electronic device to connect to the different controlled devices with the node. However, when the portable electronic device matches with the node, the matching data will only be stored in this portable electronic device, and other portable electronic devices cannot obtain the matching data from this node, which causes the using limitation. For the technology of the prior art, the portable electronic device must transfer the related matching information to an additional storage device, such as a USB disk or a cloud driver first, to allow the other portable electronic devices to read and obtain the matching information from the storage device. However, it is inconvenient for the user.

Therefore, there is a need to provide a new connection information sharing system and a connection information sharing method thereof, to solve the disadvantage of the prior art.

SUMMARY OF THE INVENTION

It is an object of the present invention to provide a connection information sharing system, which includes the function of directly transferring the connection data.

It is another object of the present invention to provide a connection data sharing method which is applied to the above mentioned system.

To achieve the abovementioned objects, the connection information sharing system of the present invention is applied in a mesh network environment, and the mesh network environment includes at least one controlled device. The connection information sharing system includes a data transferring device and a data receiving device. The data transferring device includes an integration module and a conversion module. The integration module is used for integrating a connection data to an integration data. The conversion module is electrically connected to the integration module used for converting the integration data to a connection code. The data receiving device includes a reading module and a restoring module. The reading module is used for reading the connection code. The restoring module is electrically connected to the reading module and used for restoring the connection code to the integration data, to establish a connection with the at least one controlled device via the integration data.

The connection information sharing method of the present invention includes the steps of: performing a transferring process, including: integrating the connection data to an integration data; and converting the integration data to a connection code; and performing a receiving processes, including: reading the connection code; restoring the connection code to the integration data; and establishing a connection with the at least one controlled device via the integration data.

DETAILED DESCRIPTION OF THE PREFERRED EMBODIMENTS

Figure 1:
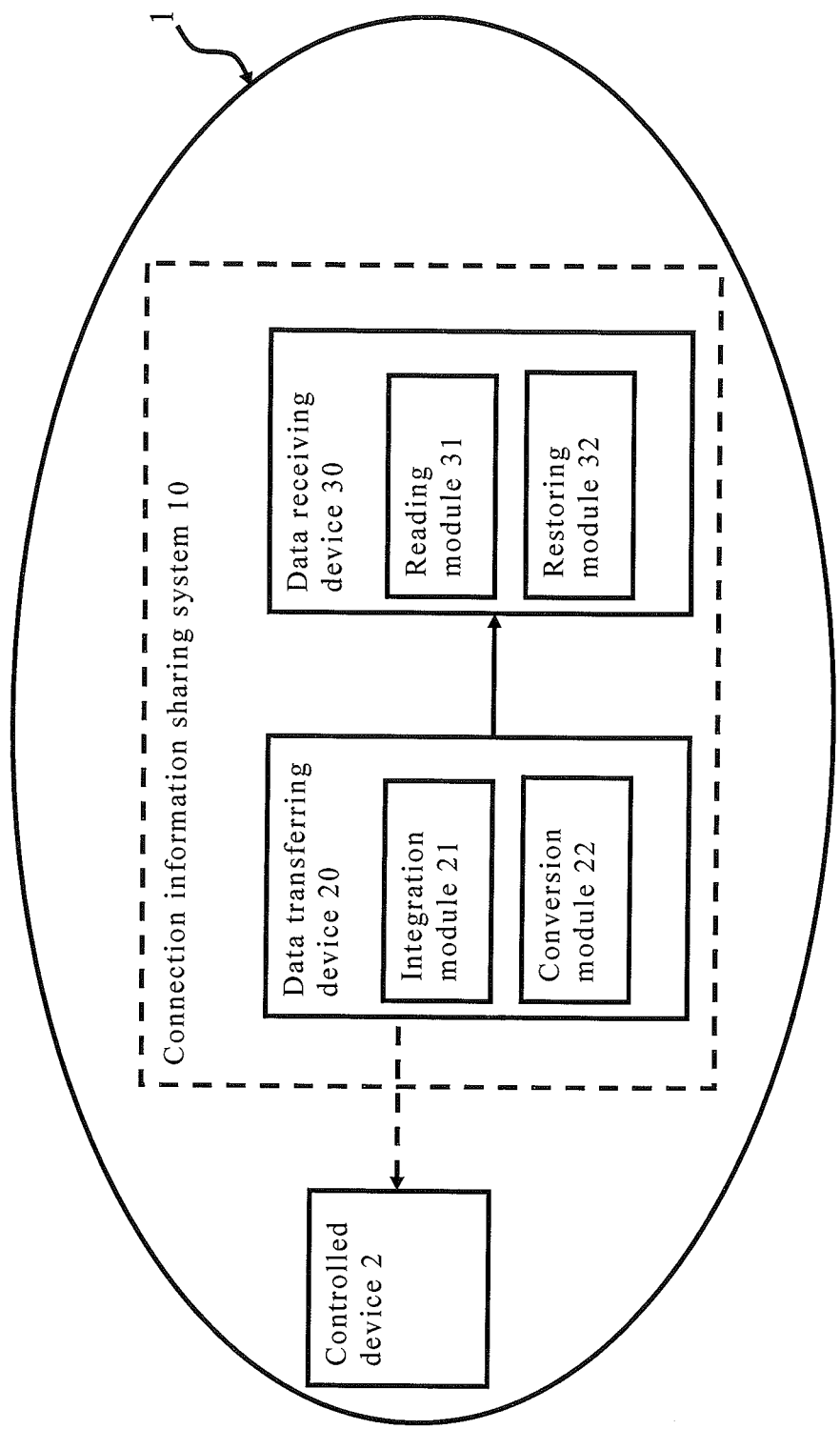
FIG. 1 illustrates a structure drawing of the connection information sharing system of the present invention.

These and other objects and advantages of the present invention will become apparent from the following description of the accompanying drawings, which disclose several embodiments of the present invention. It is to be understood that the drawings are to be used for purposes of illustration only, and not as a definition of the invention.

The connection information sharing system 10 of the present invention is applied in a mesh network environment 1, and the mesh network environment 1 includes at least one controlled device, allowing the connection information sharing system 10 to be able to establish a connection with a controlled device 2. The connection information sharing system 10 includes a data transferring device 20 and a data receiving device 30. The data transferring device 20 and the data receiving device 30 can be the same or different portable electronic devices, such as a cellphone, a tablet computer or a wearable device; but the present invention is not limited to that design. A portable electronic device may include both the data transferring device 20 and the data receiving device 30 at the same time, to have the data transferring and receiving function at the same time.

In one embodiment of the present invention, the data transferring device 20 includes an integration module 21 and a conversion module 22. The integration module 21 is used for integrating a connection data to an integration data, and the connection data is applied for the mesh network environment 1. In one embodiment of the present invention, the data transferring device 20 can use different rights to establish a connection with a different controlled device 2, such that the integration module 21 can further integrate a plurality of access rights and a plurality of controlled device matching data to generate the integration data. The conversion module 22 is electrically connected to the integration module 21, for converting the integration data to a connection code. The connection code can be a Quick Response Code (QR Code), but the present invention is not limited to that design. Because the theory of the QR Code and the application are already disclosed for people having ordinary skill in this art of the present invention, it is not the problem which is needed to be improved in the present invention, so there is no need for further description.

The data receiving device 30 includes a reading module 31 and a restoring module 32. The reading module 31 is used for reading the connection code. If the connection code is a QR Code, the reading module 31 will further capture the image of the QR Code to read the connection code. The restoring module 32 is electrically connected to the reading module 31, and used for restoring the connection code to the integration data, including to restore the plurality of access rights and the plurality of controlled device matching data. The data receiving device 30 or the portable electronic device with the data receiving device 30 can also establish a connection to the controlled device 2.

Each module of the connection information sharing system 10 can be formed via a hardware device, a software program combining with a hardware device, or a firmware combining with a hardware device, such as being an application software which is stored in a computer-readable storage medium, but the present invention is not limited to the abovementioned design. Besides, the present embodiment is only used for showing a preferred embodiment of the present invention, and to avoid further description, all possible changes and combinations will not be described in detail. However, for people having ordinary skill in this art of the present invention, the above mentioned modules or units may not be necessary. To implement the present invention, the invention may also include other details modules or units of the prior art. Each module or unit may be reduced or changed based on requirements, and other modules or units may be installed between any two modules.

Figure 2:
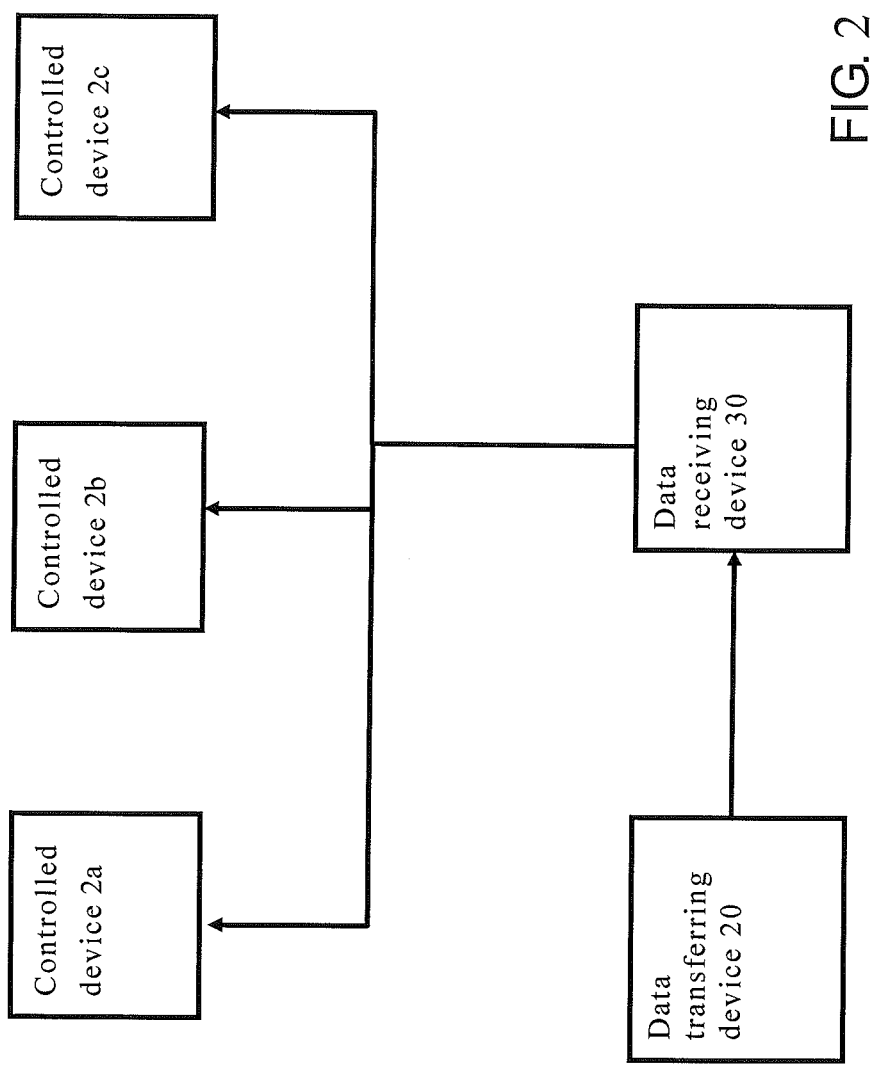
FIG. 2 illustrates an using schematic drawing of the data transferring device and the data receiving device of the present invention.

Please refer to FIG. 2, which illustrates a using schematic drawing of the data transferring device and the data receiving device of the present invention.

As shown in FIG. 2, when the portable electronic device with the data transferring device 20 establishes a connection with the controlled devices 2a, 2b, 2c, the data transferring device 20 will have the related data for connecting to the controlled devices 2a, 2b, 2c. At this moment, the data transferring device 20 will integrate and transfer the integration data for connecting to the controlled devices 2a, 2b, 2c to the data receiving device 30. Therefore, after the data receiving device 30 receives and converts the integration data, the portable electronic device with the data receiving device 30 will be able to connect to the controlled devices 2a, 2b, 2c in the mesh network environment 1, to further control the controlled devices 2a, 2b, 2c.

Figure 3:
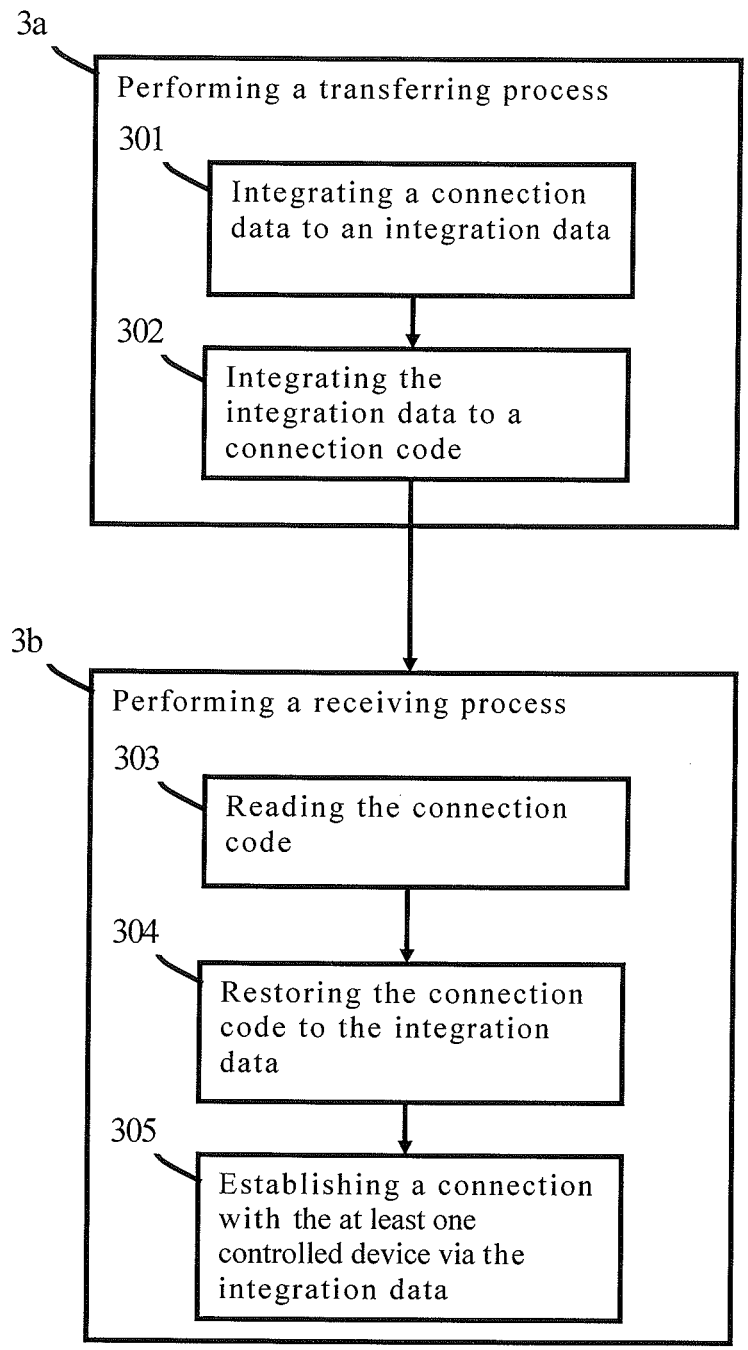
FIG. 3 illustrates a flowchart of the connection data sharing method of the present invention.

Please refer to FIG. 3 which illustrates a flowchart of the connection data sharing method of the present invention. It is to be known that, although the following description uses the abovementioned connection information sharing system 10 to be an example for describing the connection data sharing method of the present invention, the connection data sharing method of the present invention is not limited to use the same structure of the above mentioned connection information sharing system 10.

When a user needs to use the data transferring device 20 to share data, first, the data transferring device 20 executes Step 3a: performing a transferring process.

First, when the data transferring device 20 uses the different rights to establish the connection to the different controlled devices 2a, 2b, 2c, the data transferring device 20 will perform the data transferring process as the following steps.

The data transferring device 20 performs Step 301: integrating a connection data to an integration data.

The integration module 21 of the data transferring device 20 integrates the connection data of the controlled devices 2a, 2b, 2c to an integration data, and the integration module 21 can integrate the plurality of controlled device matching data and the plurality of access rights of the controlled devices 2a, 2b, 2c to the integration data.

Then, performing Step 302: integrating the integration data to a connection code.

The conversion module 22 converts the integration data to a connection code, such as converting to a QR Code, but the present invention is not limited to that design.

Then, data receiving device 30 performs Step 3b: performing a receiving process.

The data receiving device 30 performs a receiving process as the following steps.

The data receiving device 30 performs Step 303: reading the connection code.

The reading module 31 of the data receiving device 30 reads the connection code generated by the conversion module 22. If the connection code is a QR Code, the reading module 31 will capture the image of the QR Code, and then execute the reading.

Then, executing Step 304: restoring the connection code to the integration data.

The restoring module 32 restores the connection code read by the reading module 31 to the integration data, to obtain the plurality of access rights and the plurality of controlled device matching data.

Finally, performing Step 305: establishing a connection with the at least one controlled device via the integration data.

The data receiving device 30 or the portable electronic device with the data receiving device 30 can establish a connection with the whole controlled devices 2a, 2b, 2c or one of the controlled devices 2a, 2b, 2c via the integration data, to control the controlled devices 2a, 2b, 2c.

It is to be known that, the connection data sharing method of the present invention is not limited to the above mentioned steps' order, as the steps' order can be changed if the object of the present invention can be achieved.

Therefore, the data receiving device 30 or the portable electronic device with the data receiving device 30 can obtain the integration data conveniently, to further connect and control the controlled devices 2a, 2b, 2c in the mesh network environment 1.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope of the invention.

What is claimed is:

1. A connection information sharing method, applied in a mesh network environment, wherein the mesh network environment comprises at least one controlled device, with the method comprising:
    performing a transferring process comprising:
        integrating a connection data to an integration data; and
        converting the integration data to a connection code to generate a Quick Response Code (QR Code); and
    performing a receiving process comprising:
        reading the connection code;
        restoring the connection code to the integration data; and
        establishing a connection with the at least one controlled device via the integration data.

2. The connection information sharing method as claimed in claim 1, further comprising:

integrating a plurality of access rights and a plurality of controlled device matching data to the integration data.

3. The connection information sharing method as claimed in claim 1, further comprising:

capturing an image of the connection code to reading the connection code.

4. A hardware device including a computer program applied to a portable electronic device to accomplish the method as claimed in claim 1.

5. A connection information sharing system, applied in a mesh network environment, wherein the mesh network environment comprises at least one controlled device, with the connection information sharing system comprising:

a data transferring device comprising:
- an integration module for integrating a connection data to an integration data; and
- a conversion module electronically connected to the integration module, for converting the integration data to a connection code which is a Quick Response Code (QR Code); and a data receiving device comprising:
- a reading module for reading the connection code; and
- a restoring module, electronically connected to the reading module, for restoring the connection code to the integration data, and establishing a connection with the at least one controlled device via the integration data.

6. The connection information sharing system as claimed in claim 5, wherein the integration module is used for further integrating a plurality of access rights and a plurality of controlled device matching data to the integration data.

7. The connection information sharing system as claimed in claim 5, wherein the reading module is used for further capturing an image of the connection code to reading the connection code.

* * * * *